United States Patent
Chandrasekher et al.

(10) Patent No.: US 11,588,590 B2
(45) Date of Patent: *Feb. 21, 2023

(54) ADAPTIVE PAYLOAD EXTRACTION AND RETRANSMISSION IN WIRELESS DATA COMMUNICATIONS WITH ERROR AGGREGATIONS

(71) Applicant: Aira Technologies, Inc., Saratoga, CA (US)

(72) Inventors: Anand Chandrasekher, Saratoga, CA (US); RaviKiran Gopalan, Cupertino, CA (US); Yihan Jiang, Cupertino, CA (US); Arman Rahimzamani, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,351

(22) Filed: Jun. 13, 2022

(65) Prior Publication Data
US 2022/0311542 A1  Sep. 29, 2022

Related U.S. Application Data (63) Continuation of application No. 17/555,146, filed on Dec. 17, 2021, now Pat. No. 11,368,250.
(Continued)

(51) Int. Cl.
*H04L 1/18* (2006.01)
*H04L 1/24* (2006.01)
(Continued)

(52) U.S. Cl.
CPC ............ *H04L 1/242* (2013.01); *H04L 1/0009* (2013.01); *H04L 1/0041* (2013.01);
(Continued)

(58) Field of Classification Search
CPC ..... H04L 1/008; H04L 1/0025; H04L 1/0057; H04L 1/0061; H04L 1/1867; H04L 1/0041; H04L 1/1812
See application file for complete search history.

(56) References Cited

U.S. PATENT DOCUMENTS

| 5,022,029 A | 6/1991 | Guichon |
| 5,657,325 A | 8/1997 | Lou |

(Continued)

FOREIGN PATENT DOCUMENTS

CN 106487610 3/2017

OTHER PUBLICATIONS

Kotter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://aixiv.org/pdf/cs/0703061.pdf> entire document; 30 pages.

*Primary Examiner* — Shelly A Chase
(74) *Attorney, Agent, or Firm* — Carr & Ferrell LLP (57) ABSTRACT

Provided are systems and methods for adaptive payload extraction and retransmission in wireless data communications. An example method commences with transmitting a network packet to a receiver via a communication channel. The method further includes receiving a further network packet including a further payload. The method continues with determining, based on the payload and the further payload, an error vector. The method includes generating, based on the error vector, a plurality of indices. An index of the plurality of indices corresponds to a portion of a plurality of non-overlapping portions of the payload. The method further continues with selecting, based on the error vector, at least one index from the plurality of indices. The method includes sending, to the receiver via the communication channel, a further network packet. The further network
(Continued)

packet includes the selected index and a portion of the payload corresponding to the selected index.

20 Claims, 11 Drawing Sheets

Related U.S. Application Data (60) Provisional application No. 63/131,268, filed on Dec. 28, 2020.

(51) Int. Cl.
*H04L 1/00* (2006.01)
*H04L 1/1867* (2023.01)
*H04L 1/08* (2006.01)

(52) U.S. Cl.
CPC .......... *H04L 1/0046* (2013.01); *H04L 1/0047* (2013.01); *H04L 1/0061* (2013.01); *H04L 1/0072* (2013.01); *H04L 1/0091* (2013.01); *H04L 1/08* (2013.01); *H04L 1/1867* (2013.01)

(56) References Cited

U.S. PATENT DOCUMENTS

| | | | |
|---|---|---|---|
| 6,126,310 A | 10/2000 | Osthoff et al. | |
| 6,418,549 B1 | 7/2002 | Ramchandran | |
| 6,505,253 B1 | 1/2003 | Chiu | |
| 7,016,658 B2 | 3/2006 | Kim et al. | |
| 7,848,350 B1 | 12/2010 | Inamdar | |
| 7,971,131 B1 | 6/2011 | Ordentilch | |
| 8,223,643 B1 | 7/2012 | Wolfgang | |
| 8,327,232 B2 | 12/2012 | Budampati et al. | |
| 8,352,830 B2 | 1/2013 | Landschaft et al. | |
| 8,437,267 B2 | 5/2013 | Amir et al. | |
| 8,473,821 B2 | 6/2013 | Taghavi Nasrabadi et al. | |
| 8,990,663 B2 | 3/2015 | Liu et al. | |
| 10,270,564 B2 | 4/2019 | Djukic et al. | |
| 11,368,250 B1 | 6/2022 | Chandrasekher et al. | |
| 11,368,251 B1 | 6/2022 | Chandrasekher et al. | |
| 2001/0030954 A1 | 10/2001 | Hameleers | |
| 2002/0054608 A1 | 5/2002 | Wan | |
| 2003/0215029 A1 | 11/2003 | Limberg | |
| 2004/0049725 A1 | 3/2004 | Golitschek et al. | |
| 2005/0094561 A1 | 5/2005 | Raaf | |
| 2005/0208897 A1 | 9/2005 | Lyons | |
| 2007/0168197 A1 | 7/2007 | Vasilache | |
| 2008/0002688 A1 | 1/2008 | Kim et al. | |
| 2008/0002790 A1 | 1/2008 | Itoh | |
| 2008/0225735 A1 | 9/2008 | Qiu | |
| 2008/0250299 A1 | 10/2008 | Maillet et al. | |
| 2009/0119566 A1 | 5/2009 | Hiromitsu | |
| 2009/0276686 A1 | 11/2009 | Liu et al. | |
| 2010/0037270 A1 | 2/2010 | Bennett | |
| 2010/0103830 A1* | 4/2010 | Salgado | H04L 1/0061 370/252 |
| 2010/0165868 A1 | 7/2010 | Gersemsky | |
| 2010/0192175 A1 | 7/2010 | Bachet | |
| 2010/0202416 A1 | 8/2010 | Wilhelmsson et al. | |
| 2010/0262885 A1 | 10/2010 | Cheng | |
| 2011/0131461 A1 | 6/2011 | Schulz | |
| 2011/0206065 A1 | 8/2011 | Kim et al. | |
| 2011/0258519 A1* | 10/2011 | Laevens | H04L 1/0057 714/E11.002 |
| 2013/0018889 A1 | 1/2013 | Jagmohan | |
| 2013/0132786 A1 | 5/2013 | Tanigawa et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2015/0009902 A1 | 1/2015 | Emmanuel | |
| 2016/0062954 A1 | 3/2016 | Ruff | |
| 2016/0254881 A1 | 9/2016 | Meylan | |
| 2018/0048567 A1 | 2/2018 | Ignatchenko | |
| 2018/0167171 A1 | 6/2018 | Wu | |
| 2019/0028237 A1 | 1/2019 | Pan et al. | |
| 2019/0097680 A1 | 3/2019 | O'Brien et al. | |
| 2021/0392033 A1 | 12/2021 | Haartsen | |
| 2022/0045696 A1 | 2/2022 | Boussard | |
| 2022/0132367 A1 | 4/2022 | Liu et al. | |
| 2022/0209893 A1 | 6/2022 | Chandrasekher et al. | |
| 2022/0209894 A1 | 6/2022 | Chandrasekher et al. | |
| 2022/0209895 A1 | 6/2022 | Chandrasekher et al. | |
| 2022/0209897 A1 | 6/2022 | Jiang et al. | |
| 2022/0321260 A1 | 10/2022 | Chandrasekher et al. | |

* cited by examiner

ADAPTIVE PAYLOAD EXTRACTION AND RETRANSMISSION IN WIRELESS DATA COMMUNICATIONS WITH ERROR AGGREGATIONS

CROSS REFERENCE TO RELATED APPLICATIONS

The present application is a continuation of U.S. patent application Ser. No. 17/555,146, filed Dec. 17, 2021, entitled "Adaptive Payload Extraction and Retransmission in Wireless Data Communications with Error Aggregations," which claims priority of U.S. Provisional Patent Application No. 63/131,268 filed on Dec. 28, 2020 and entitled "Indexing-based Feedback Codes and Methods of Use," all of which are hereby incorporated herein by reference in their entirety, including all references and appendices cited therein, for all purposes, as if fully set forth herein.

TECHNICAL FIELD

This disclosure relates to data processing. More specifically, this disclosure relates to systems and methods for adaptive payload extraction and retransmission in wireless data communications.

BACKGROUND

Wireless data transmission of data is widely used in many applications. However, data transmission can be corrupted due to interference and signal attenuation. Conventional methods for sending network packets include resending entire network packet from a transmitter to a receiver if the network packet is corrupted during the initial transmission. The conventional methods, however, are not efficient and stable due to the insufficient bandwidth or signal strength of wireless communication channels.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to systems and methods for adaptive payload extraction and retransmission in wireless data communications. According to one example embodiment of the present disclosure, a method for adaptive payload extraction and retransmission in wireless data communications is provided. The method may commence with transmitting a network packet to a receiver via a communication channel. The network packet may include a payload. The method may further include receiving, from the receiver and via the communication channel, a further network packet including a further payload. The method may then continue with determining, based on the payload and the further payload, an error vector. The method may include generating, based on the error vector, a plurality of indices. An index of the plurality of indices may correspond to a portion of a plurality of non-overlapping portions of the payload. The method may further continue with selecting, based on the error vector, at least one index from the plurality of indices. The method may include sending, to the receiver via the communication channel, a further network packet. The further network packet may include the selected index and a portion of the payload corresponding to the selected index.

According to another embodiment, a system for adaptive payload extraction and retransmission in wireless data communications is provided. The system may include at least one processor and a memory communicatively coupled to the processor and storing instructions executable by the at least one processor to perform the above-mentioned method. The processor can be configured to implement the operations of the above-mentioned method for adaptive payload extraction and retransmission in wireless data communications.

According to yet another aspect of the disclosure, provided is a non-transitory computer-readable storage medium, which embodies computer-readable instructions. When the computer-readable instructions are executed by a computer, they cause the computer to implement the above-mentioned method for multi-tier caching of data.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The technology described herein relates to systems and methods for adaptive payload extraction and retransmission in wireless data communications. Some embodiments of the present disclosure may provide reliable data transmission between a transmitter and a receiver. The transmitter may transmit a network packet to receiver via a communication channel. The network packet may include a payload. The receiver may determine that network packet is corrupted. In response to the determination, a maximum predetermined number of iterations involving additional data transfer between the receiver and the transmitter can be performed.

Each of the iterations may include the following steps. The transmitter may determine, based on the original network packet and the corrupted network packet, an error vector. The transmitter may then generate, based on the error vector, a plurality of indices. An index of the plurality of indices may correspond to a portion of a plurality of non-overlapping portions of the error vector. The length of portions can be determined in an adaptive manner to minimize number of bits required to encode the portions including non-zero bits of error vector and indices corresponding to the portions. The transmitter may select, based on the error vector, at least one index from the plurality of indices. The transmitter may send, to the receiver, a further network packet. The further network packet may include the selected index and a portion of error vector corresponding to the selected index. The receiver may use the portions of the error vector to correct the payload of originally received network packet. The receiver may validate the corrected payload. If corrected payload remains corrupted, another iteration is executed.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1:
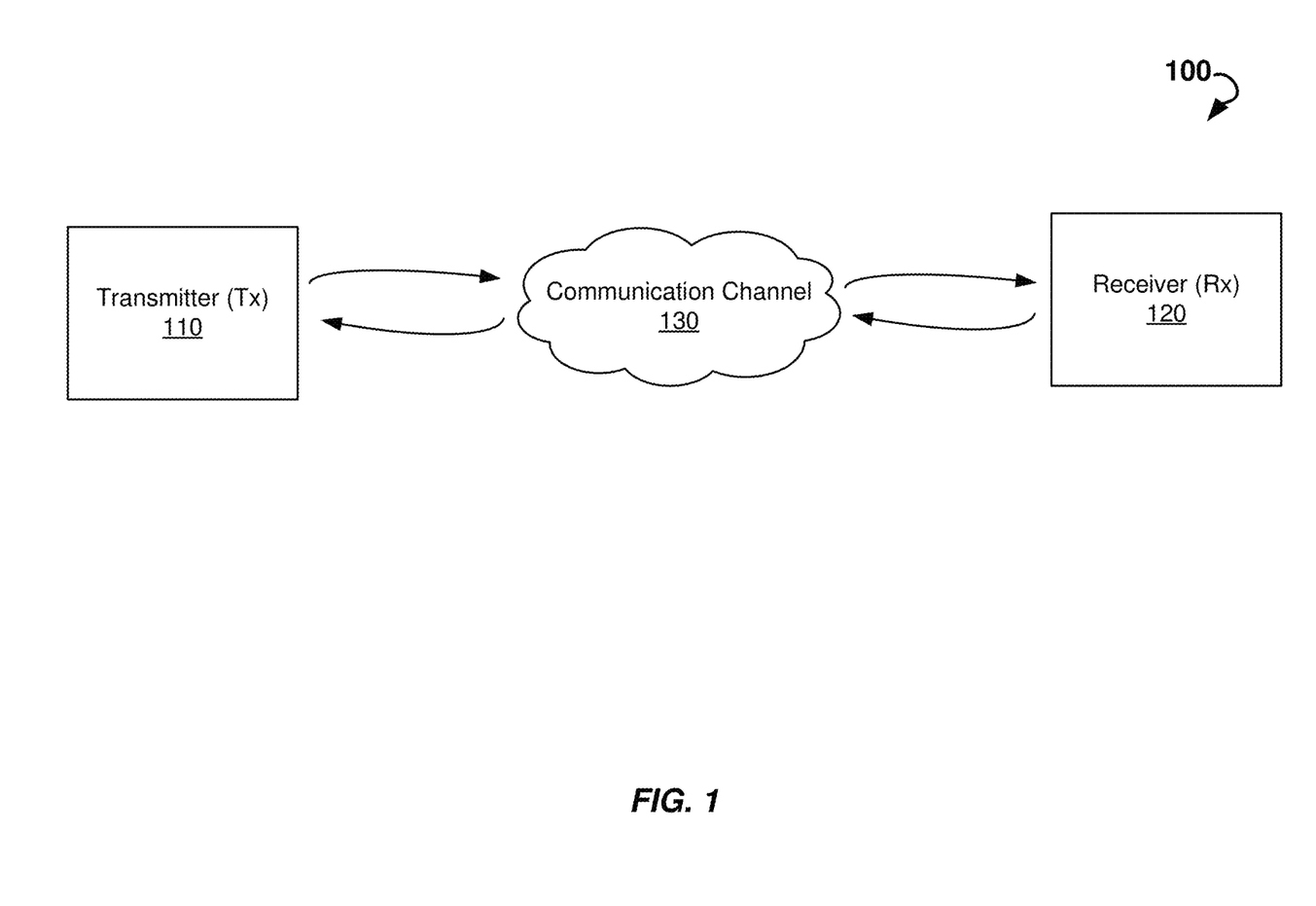
FIG. 1 is a block diagram of an environment, in which systems and methods for adaptive payload extraction and retransmission in wireless data communications can be implemented, according to some example embodiments.

Referring now to the drawings, FIG. 1 is a block diagram of environment 100, in which systems and methods for adaptive payload extraction and retransmission in wireless data communications can be implemented, according to some example embodiments. The environment 100 may include a transmitter 110, a receiver 120, and a communication channel 130. The transmitter 110 may send network packets over the communication channel 130. The receiver 120 may receive the network packets and analyze integrity of the network packets.

In various embodiments, the transmitter 110 or receiver 120 may include a computer (e.g., laptop computer, tablet computer, and desktop computer), a server, a cellular phone, a smart phone, a gaming console, a multimedia system, a smart television device, wireless headphones, set-top box, an infotainment system, in-vehicle computing device, informational kiosk, smart home computer, software application, computer operating system, a modem, a router, and so forth.

The communication channel 130 may include the Internet or any other network capable of communicating data between devices. Suitable networks may include or interface with anyone or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3line, Digital Data Service connection, Digital Subscriber Line connection, an Ethernet connection, an Integrated Services Digital Network line, a dial-up port such as a Y.90, Y.34 or Y.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The communication channel 130 can further include or interface with anyone or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
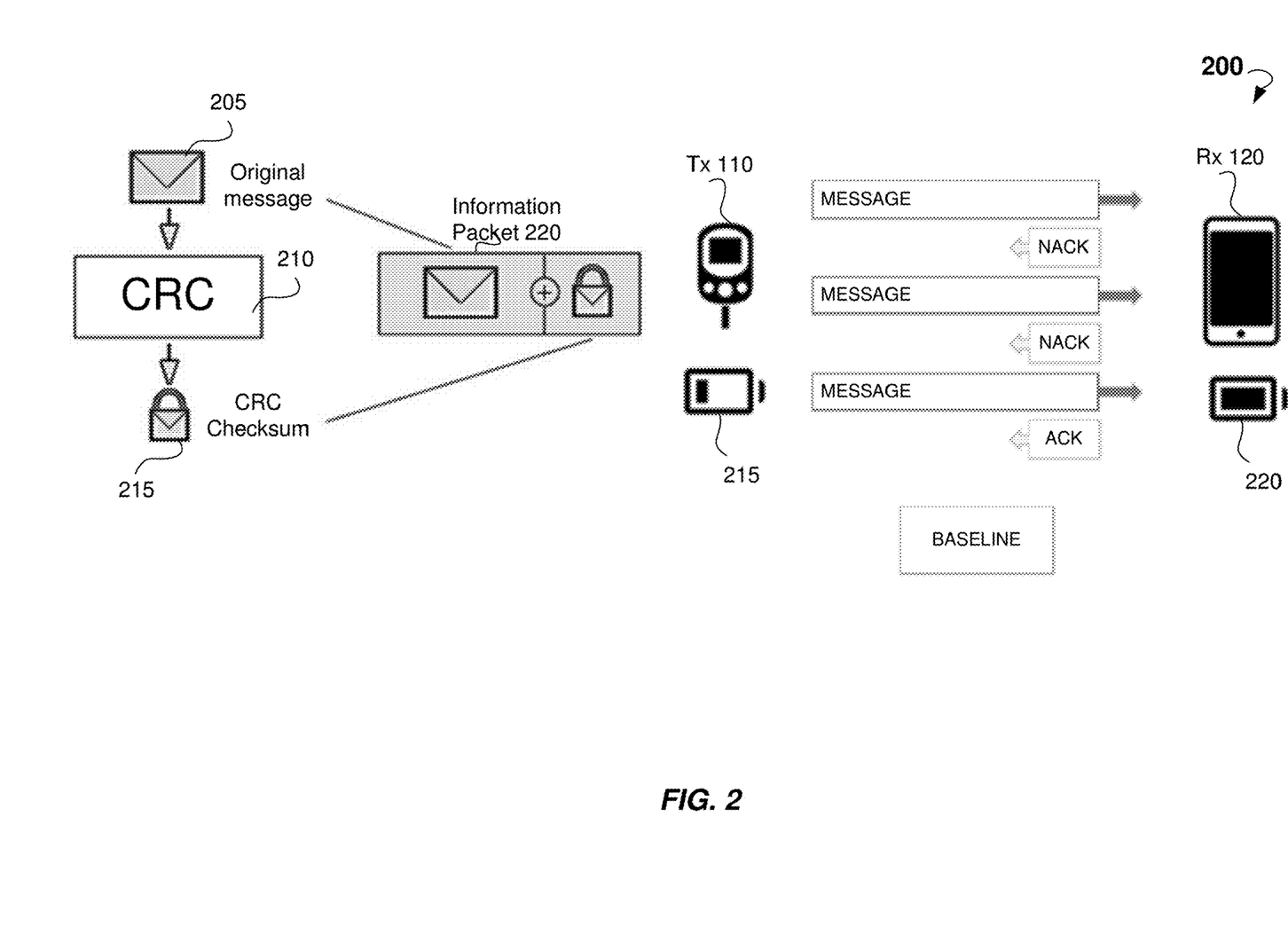
FIG. 2 is a block diagram showing an example network packet and an automatic repeat request (ARQ) method for data transmission, according to some example embodiments of the present disclosure.

FIG. 2 is a block diagram showing an example information packet 220 and an automatic repeat request (ARQ) method 200 for wireless data transmission, according to some example embodiments of the present disclosure.

Wireless communication requires sending information packet 220 (also referred as network packet 220) from transmitter 110 (Tx) to receiver 120 (Rx) without error. However, the information packet can be corrupted even if it is transmitted with strong error correction codes. Current wireless protocols utilize error detecting codes and retransmission schemes to protect the information packet's integrity.

Cyclic redundancy check 210 (CRC) is the most-widely-used short error-detecting code that is used to detect accidental payload changes during transmission. CRC is computed on the payload 205 at the Tx to receive the checksum 215. The checksum 215 is attached to the end of the payload 205 to form the information packet 220. Both payload 205 and CRC checksum 215 are transmitted from transmitter 110 to receiver 120. At receiver 120, the received CRC checksum is compared to the CRC check computed by receiver 120 on the received payload. If the received CRC equals to the computed CRC, the CRC check has passed. If the received CRC does not match the computed CRC, the CRC check has failed, thus implying that the received payload has been corrupted.

When CRC check passes, there is a very high probability that information packet 220 is not contaminated. In this case, an acknowledgment message ACK is sent from receiver 120 to transmitter 110 to instruct transmitter 110 to continue with transmitting the next packet.

When CRC check fails, there is a very high probability that the packet is corrupted. In this case, a non-acknowledgment message NACK is sent from receiver 120 to transmitter 110 to ask for retransmission of information packet 220. There is some probability that ACK or NACK may not be received by transmitter 110. In this case, transmitter 110 retransmits the information packet 220 after a predetermined timeout.

The CRC check passes only when the entire information packet 220 received by receiver 120 is error free. In its standard form, CRC is not designed for correcting error. CRC check fails even in cases where even a single bit in the received information packet 220 is erroneous. Thus, the presence of a single erroneous bit in the received information packet triggers a NACK transmission from Rx back to Tx, which in turn attempts to retransmit the entire information packet 220.

Typically, in real-world communication channels, errors in information packets happen in short groups or aggregations, due to either (a) modulation causing correlation between adjacent bits, and (b) interference causing corruption of a few adjacent bytes. The interference can be interpreted as spontaneous and persistent channel quality degradation, which can last during transmission of a large portion of a packet. Accordingly, the channel quality drop may result in a sudden increase in the number of correlated errors over a large section of the received information packet.

Figure 3:
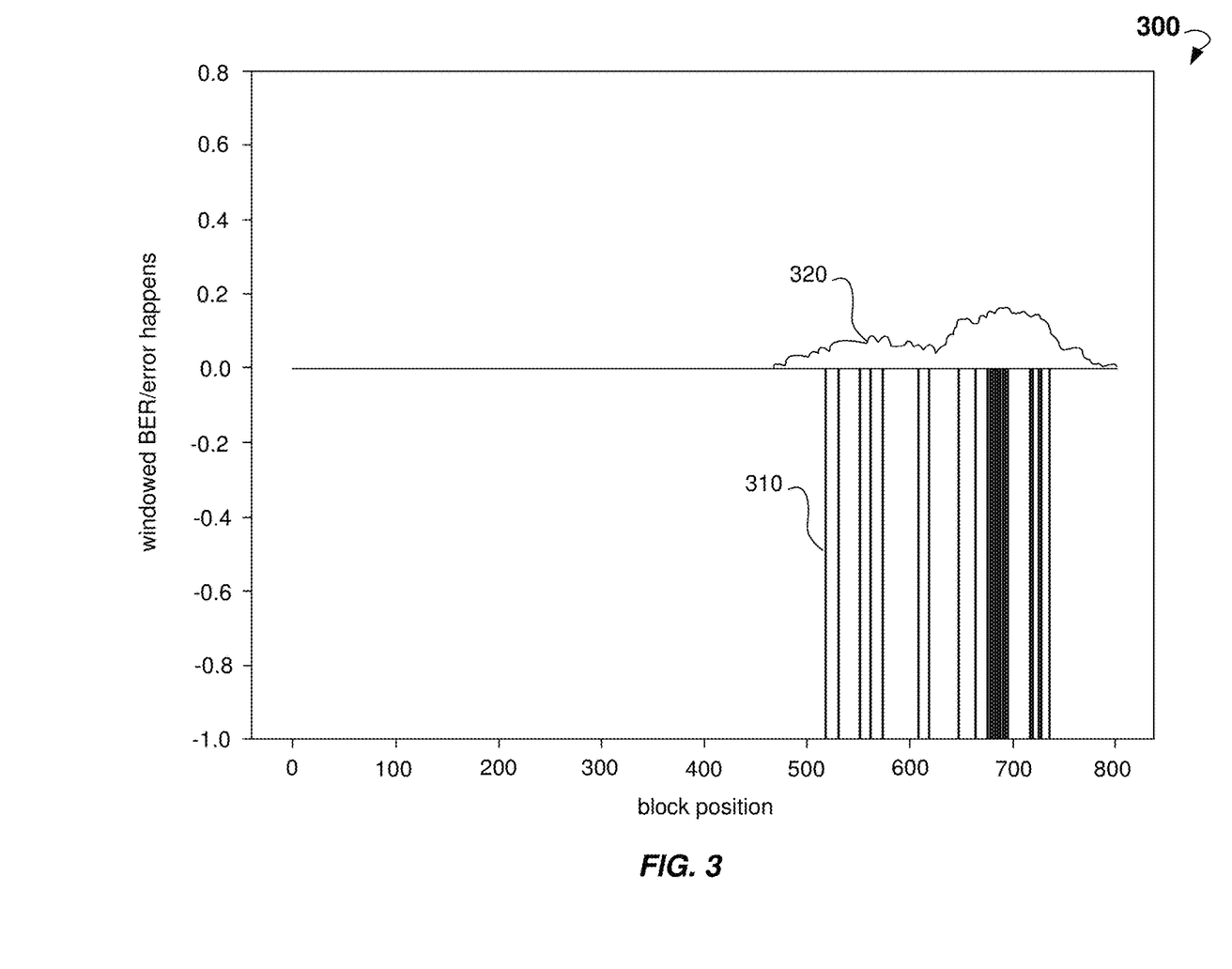
FIG. 3 is a plot of example errors in information packets transmitted wirelessly.

FIG. 3 is a plot 300 of example errors in information packets transmitted wirelessly. The graph 310 shows error positions in the information packets. The graph 320 shows an average of the errors, where the average is calculated with a window size of 50 bits. As shown in FIG. 3, the errors in information packets are bursty and aggregated.

According to some embodiments of the present disclosure, receiver 120 may provide feedback concerning received information packet 220 back to transmitter 110. In this case, transmitter 110 can be configured to detect interference error patterns in information packets and distinguish these error patterns from regular independent and identically distributed (IID) noise errors. Accordingly, transmitter 110 can treat the packets with interference error patterns in a smart and effective way. In some embodiments, receiver 120 may sent the received information packet as feedback to transmitter 110 if CRC of received information packet has failed.

Providing the feedback to transmitter 110 may be advantageous over attempts to correct bits in a bit-by-bit manner at receiver side in situations when there is a large burst of errors in a portion of received information package due to interference. In these situations, it can be more efficient to overwrite the entire corrupted section of the received information package with a freshly retransmitted copy of this section from transmitter 110. For example, if the information packet includes a corrupted 20-bit section having 10 error bits, then 10 bits are required to define each bit's location (also referred herein as indices). Overall, 10*10=100 bits are required to be retransmitted to correct all the error bits in the corrupted section. On the other hand, only 30 bits are required to be retransmitted if the transmitter retransmits the entire 20-bit section and 10 bits to determine the start bit's location. Thus, using single-bit indexing requires a large bandwidth, which is not very efficient because most of the errors are adjacent.

Figure 4:
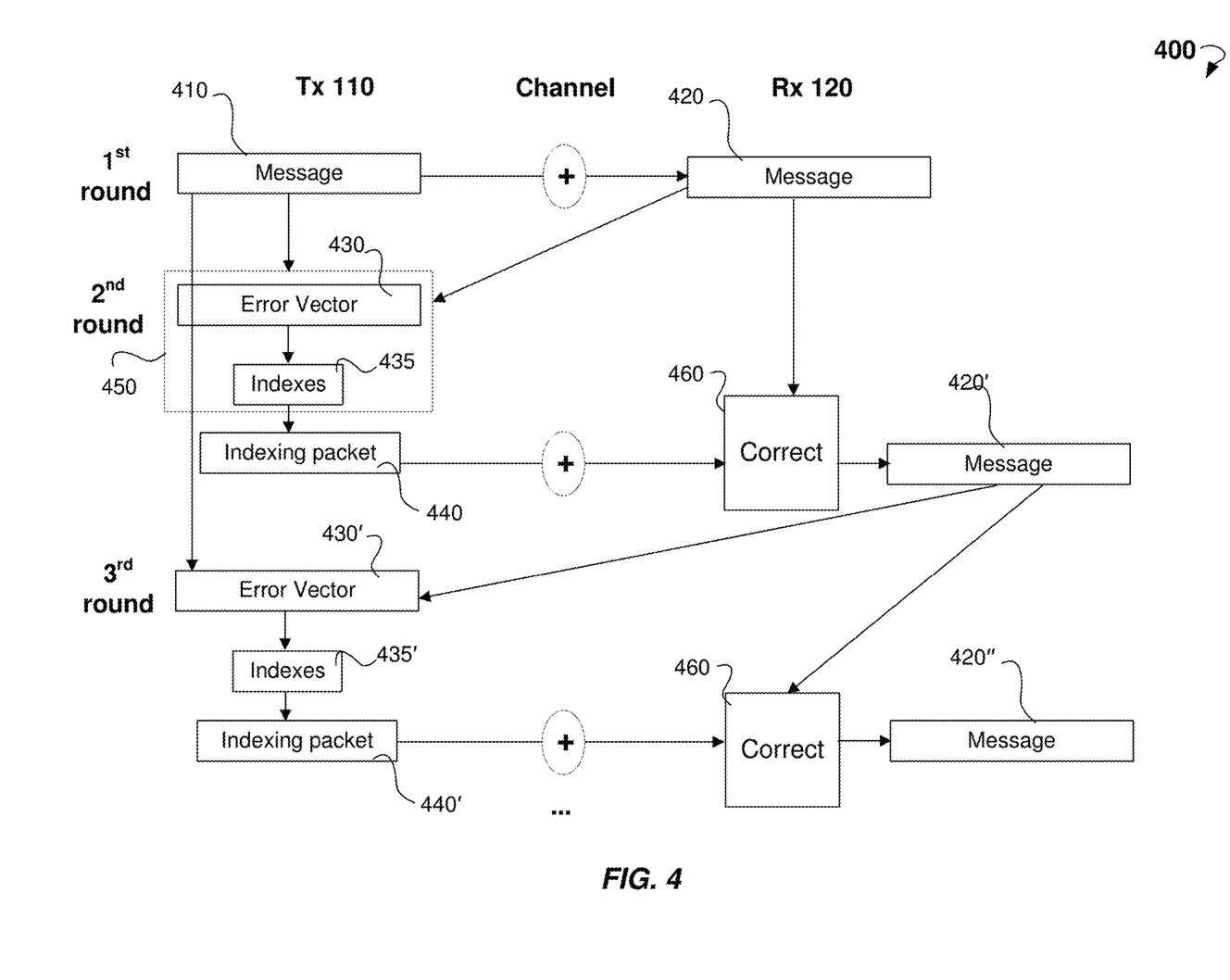
FIG. 4 shows an adaptive feedback scheme for data transfer between transmitter and receiver, according to an example embodiment of the present disclosure.

FIG. 4 shows an adaptive feedback scheme 400 for data transfer between transmitter 110 and receiver 120. In adaptive feedback scheme 400, both error location and payload are sent together from transmitter 110 to receiver 120.

According to the first round of the adaptive feedback scheme 400, transmitter 110 sends message to receiver 120. The message 410 is an information packet shown 220 including a payload and CRC checksum calculated on the payload at the transmitter side. The receiver 120 may calculate a new CRC checksum on the received payload and compare the new CRC checksum to CRC checksum received from the transmitter. If the calculated CRC checksum does not match the received CRC checksum, then receiver 120 may send the received message 420 back to transmitter 110.

According to the second round of the adaptive feedback scheme 400, the transmitter compares the message 420 received from the receiver 120 to message 410 originally sent to the receiver 120 and determine error vector 430. The error vector 430 can be found as a bitwise difference between message 410 and message 420. Based on the error vector 430, transmitter 110 determines index width and ordinal number of indexes 435 in the error message using an adaptive indexing scheme 450.

Figure 5:
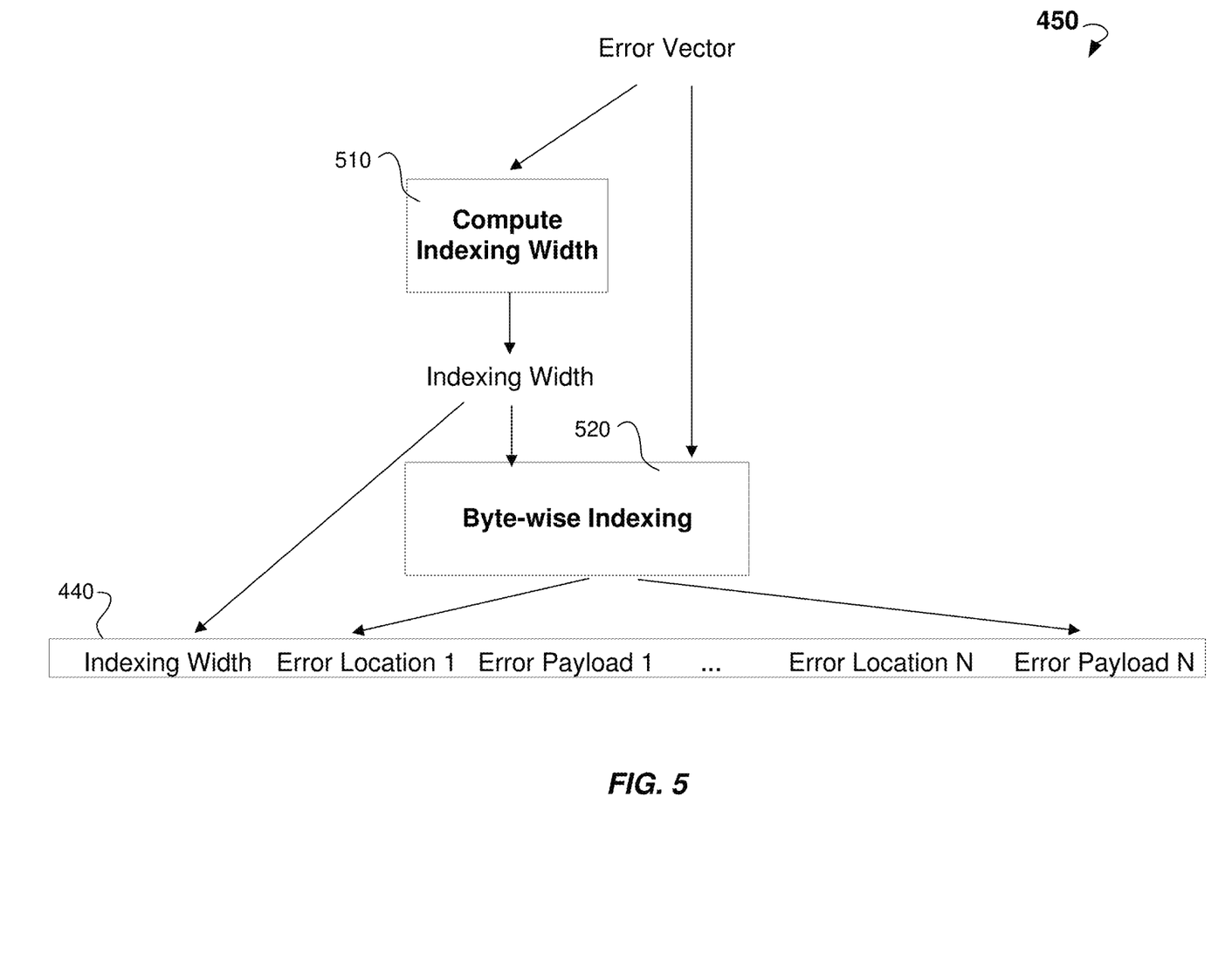
FIG. 5 shows an adaptive indexing scheme, according to an example embodiment.

FIG. 5 shows the adaptive indexing scheme 450, according to an example embodiment. The adaptive indexing scheme 450 includes blocks 510 and 520. In block 510, transmitter 110 computes an indexing width. The indexing width can be defined as a size of blocks (section) that error vector 430 can be divided into. The size may include 1 bit, 1 byte, 2 bytes, and so on. In block 520, the transmitter 110 may index portions (blocks, section) error vector 430 according to the indexing width. In case of 1 bit indexing, each bit in error vector 430 is assigned with an index. In case of 1-byte indexing, each consecutive byte of the error vector is assigned with an index. In case of 2-byte indexing, each consecutive 2-byte portions of the error vector is assigned with an index, and so on.

The transmitter 110 may further generate an indexing packet (message 440). In one embodiment, the indexing packet (message 440) may include indexing width, the location of first portion of the error vector 430, the first portion of the error vector 430, the location of second portion of the error vector 430, the second portion of the error vector 430, and so on. The indexing packet (message 440) may include only those portions of the error vector 430 that include non-zero bits. In another embodiment, the indexing packet (message 440) may include corresponding portions of message 410 instead of the portions of error vector 430. The indexing packet (message 440) can be transmitted to the receiver 120 for correcting message 420.

The indexing width may depend on the length of the error section in payload part of message 410. Larger indexing width can be effective in situation when bursty errors have a larger size. Larger indexing width can be less efficient if the errors are less aggregated. Accordingly, using the same indexing width and coding rate cannot guarantee consistent good performance for different environments with different noise levels during transmission. A criterion of choosing indexing width can be based on minimizing the compressed representation:

$$K = \operatorname{argmin}_{i \in \{1, \ldots, N\}} L(e, i)$$

where K is the resulting indexing width, e is the error vector, i is the indexing width, among a list of selections. L(e, i) is the indexing length corresponding to the given error vector and indexing width. The adaptive indexing scheme 450 may choose the shortest encoding scheme for the given error vector. The shortest encoding scheme improves reliability of transmission because: (a) the probability of colliding with error decreases when the indexing packet (message 440) is shorter than a predetermined size, and (b) the shorter the indexing packet (message 440), stronger the indexing packet can be protected by error correction codes.

There is no need to explicitly compute all possible indexing (1-bit, 2-bit, . . . , 7-bit, . . . , and so on) to determine what indexing width is required. The adaptive indexing scheme 450 algorithm can analyze error vector 430 via keeping track of the length of the encoding representation with different parameters and return the smallest parameter. The indexing configuration (mode) can be placed in the beginning of the indexing packet (message 440), so the receiver 120 can determine how to decode the indexing packet.

Referring back to FIG. 4 and the second round of the adaptive feedback scheme 400, receiver 120 may use the received indexing packet (message 440) to correct the message 420 in block 460. The receiver may determine, based on indexing configuration in the message, a width and locations of portions of message 420 needed to be corrected. In some embodiments, where the indexing packet (message 440) includes portions of error vector 430, the receiver may bitwise add portions of error vector 430 to corresponding portion of message 420. In other embodiments, where the indexing packet (message 440) includes portions of original message 410, receiver 120 may replace the portions of the message 420 with corresponding portions of the message 410. The receiver 120 may calculate CRC checksum for the resulting message 420'. If CRC check fails, the receiver sends the resulting message 420' to the transmitter 110.

According to third round of the adaptive feedback scheme 400, transmitter 110 may determine error vector 430' based on the original message 410 and the message 420'. The transmitter 110 may determine, based on error vector 430', new indexes 435' and new indexing packet 440'. The transmitter 110 may send the indexing packet 440' to receiver 120. The receiver 120 may correct the message 420' (previously corrected message 420) to obtain message 420". The receiver 120 determine CRC checksum for message 420", and, if CRC fails, sends the message 420" for another round of correction. The adaptive feedback scheme 400 can include a predetermined number of rounds. If the message 420 is not corrected after the predetermined number of rounds, then the receiver 120 may request the transmitter 110 to resend the entire original message 410.

Figure 6:
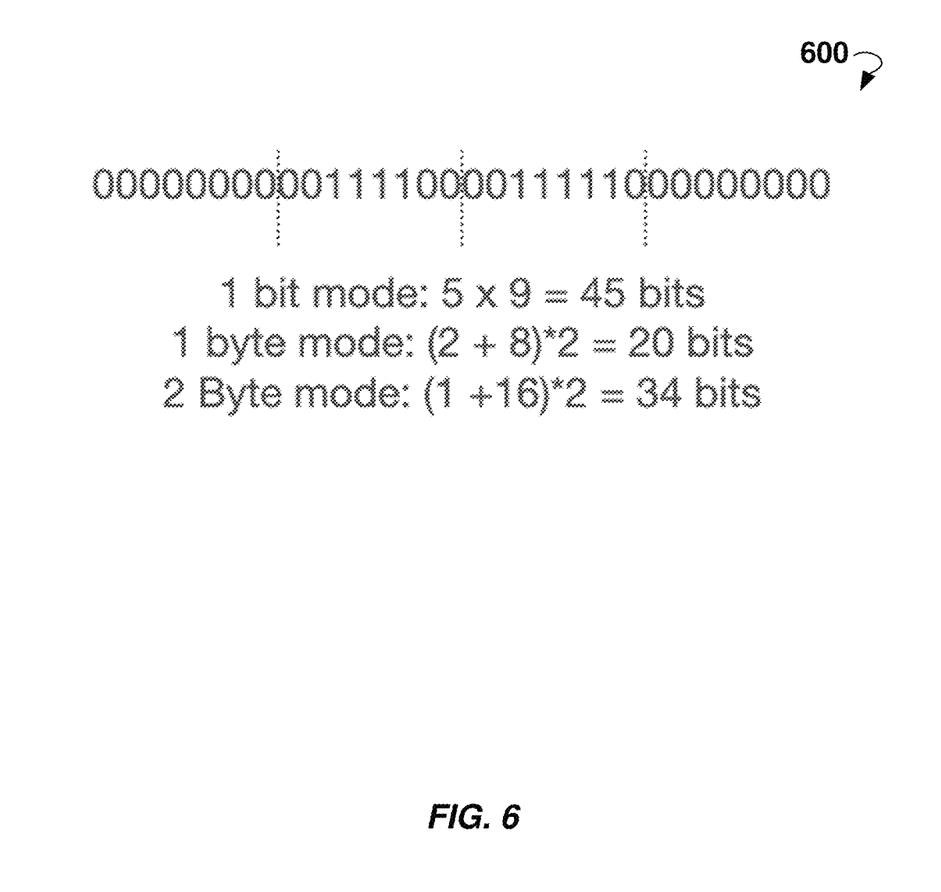
FIG. 6 shows an example error vector and example indexing widths determined for the error vector.

FIG. 6 shows example error vector 600 and example indexing widths determined for the error vector 600. If index width is 1 bit, then the indexing packet (message 440) includes at least 9 indexes of 5-bit width, because 5 bits are needed to distinguish 2◯5 positions in error vector 600. If index width is 1 byte, then the error portions can be distinguished by 2-bit index. Overall, the indexing packet (message 440) includes at least 20 bits. If index width is 2 bytes, then the error portions can be distinguished by 1-bit index. Overall, the indexing packet (message 440) includes at least 34 bits. Accordingly, the index width of 1 byte is preferable for the indexing portions of error vector 600.

An algorithm for determining index can described with following pseudo-codes:

```
Given Error Vector e, and indexing width [W_1, , W_N}
Output Res_1, Res_N=0, ..., 0
For idx in range(L):
    For W_i in [W_1, ..., W_N}
        If mod(idx, W_i) == 0 and sum (e(idx-W_i:idx)) != 0
            Res_i += W_i + ceil(log2(L/W_i))
Res = min(Res_1, ..., Res_N)
```

Figure 7:
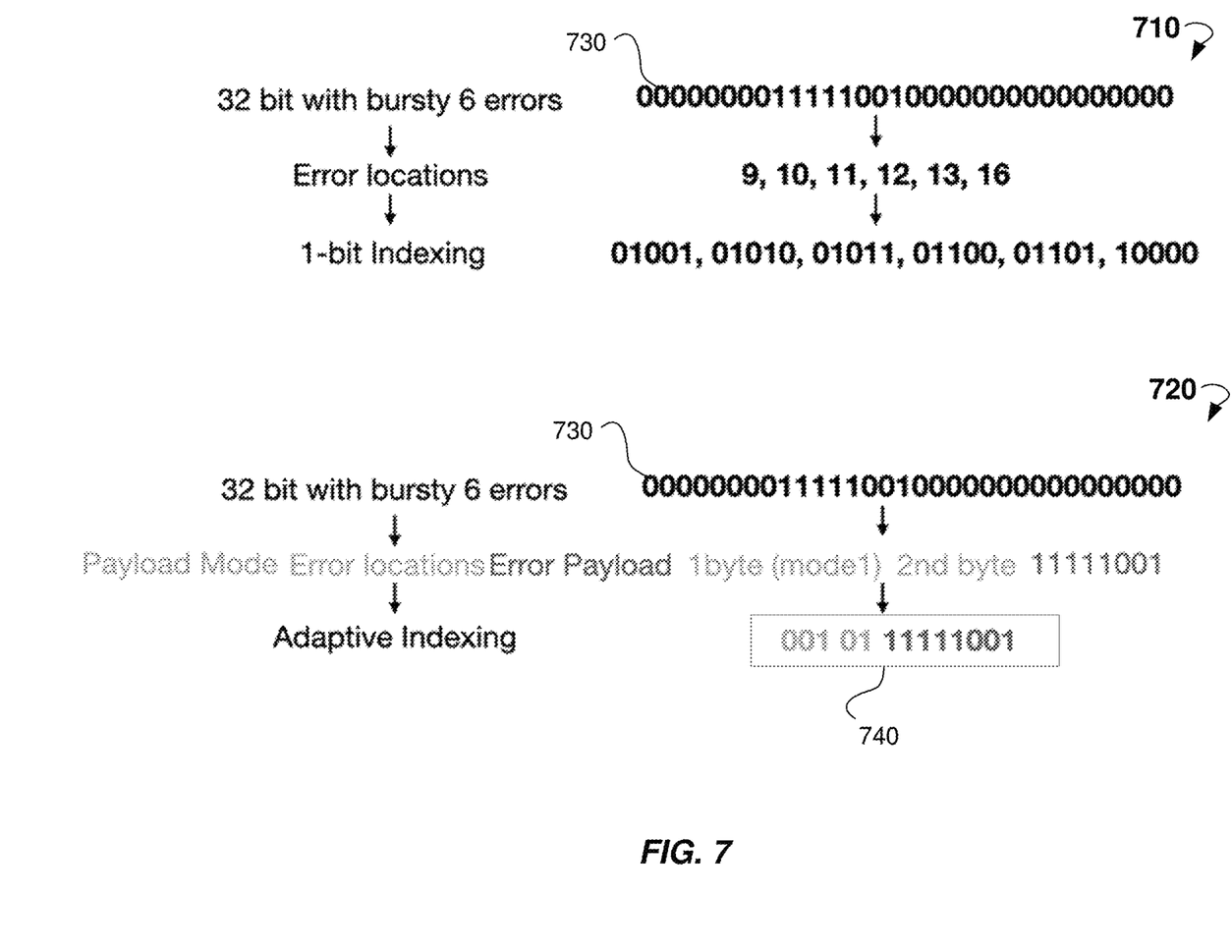
FIG. 7 shows indexing schemes for another example error vector.

FIG. 7 shows indexing schemes 710 and 720 for an example error vector 730. The indexing scheme 710 uses 1-bit indexing width, which is the error vector 730 is divided into 1-bit portions. Error locations in the error vector 730 require 5 bits to encode. Therefore, using 1-bit indexing requires 30 bits in total to encode the error vector 730.

The indexing scheme 720 is an example of adaptive indexing, where indexing width is 8 bits (1 byte). The length of error vector 730 is four bytes, where the second byte is corrupted by interference noise. Encoding error locations requires 2 bits. Only the second byte of the error vector needed to be sent to the receiver. The payload is 8 bits. Accordingly, an indexing packet 740 may include 3 bits indicating mode or configuration of the indexing scheme (001), a 2-bit part (01) indicating the location of the portion to be corrected, and the payload including the second portion (11111001) of the error vector. Thus, the total number of bits required to encode the error vector is 10.

The examples of indexing in FIG. 7 show that adaptive indexing significantly improves the coding efficiency of indexing, when dealing with bursty and aggregated noise. Moreover, more efficient encoding of indexing can provide more room for channel coding with a lower code rate, which leads to more reliable communication performance.

Figure 8:
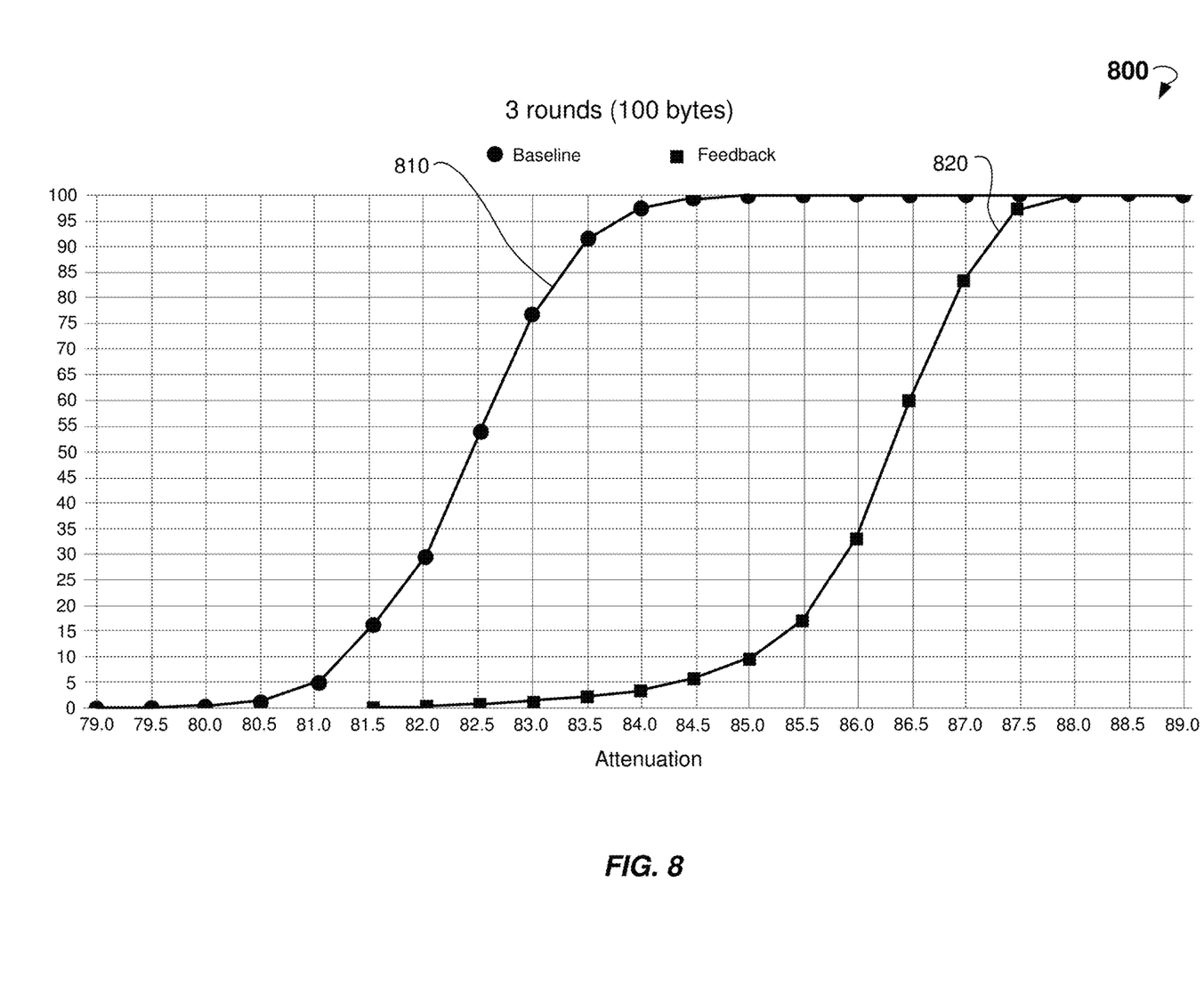
FIG. 8 is plot of performance of data transmitting schemes at different level of attenuation, according to one example embodiment.

FIG. 8 is plot 800 of performance of data transmitting at different level of attenuation, according to one example embodiment. X-axis in the plot 800 is a level of attenuation of signal during transmitting of data. Y-axis is a percentage of packets successfully transmitted in 3 rounds. The length of each of the packets is 100 bytes. Graph 810 corresponds to a baseline scheme, where the receiver requests retransmission of entire packet and does not perform on the received packets. Graph 820 corresponds to adaptive feedback scheme described in FIG. 4.

Figure 9:
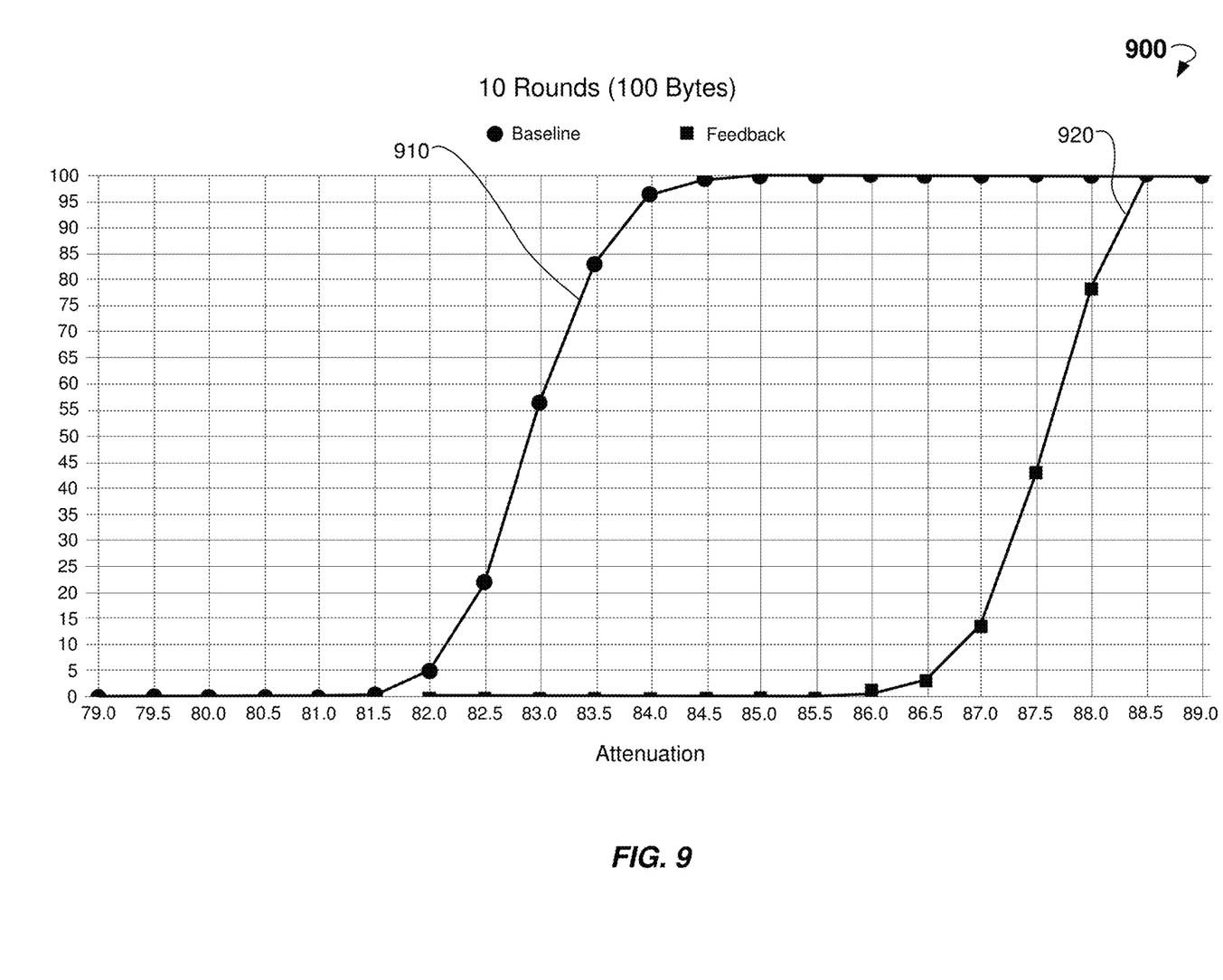
FIG. 9 is plot of performance of data transmitting schemes at different level of attenuation, according to another example embodiment.

FIG. 9 is plot 900 of performance of data transmitting at a different level of attenuation, according to another example embodiment. X-axis in the plot 800 is a level of attenuation of signal during transmitting of data. Y-axis is a number of packets successfully transmitted in 10 rounds. The length of each of the packets is 100 bytes. Graph 910 corresponds to a baseline scheme, where the receiver requests retransmission of entire packet and does not perform corrections on the received packets. Graph 920 corresponds to adaptive feedback scheme described in FIG. 4.

Figure 10:
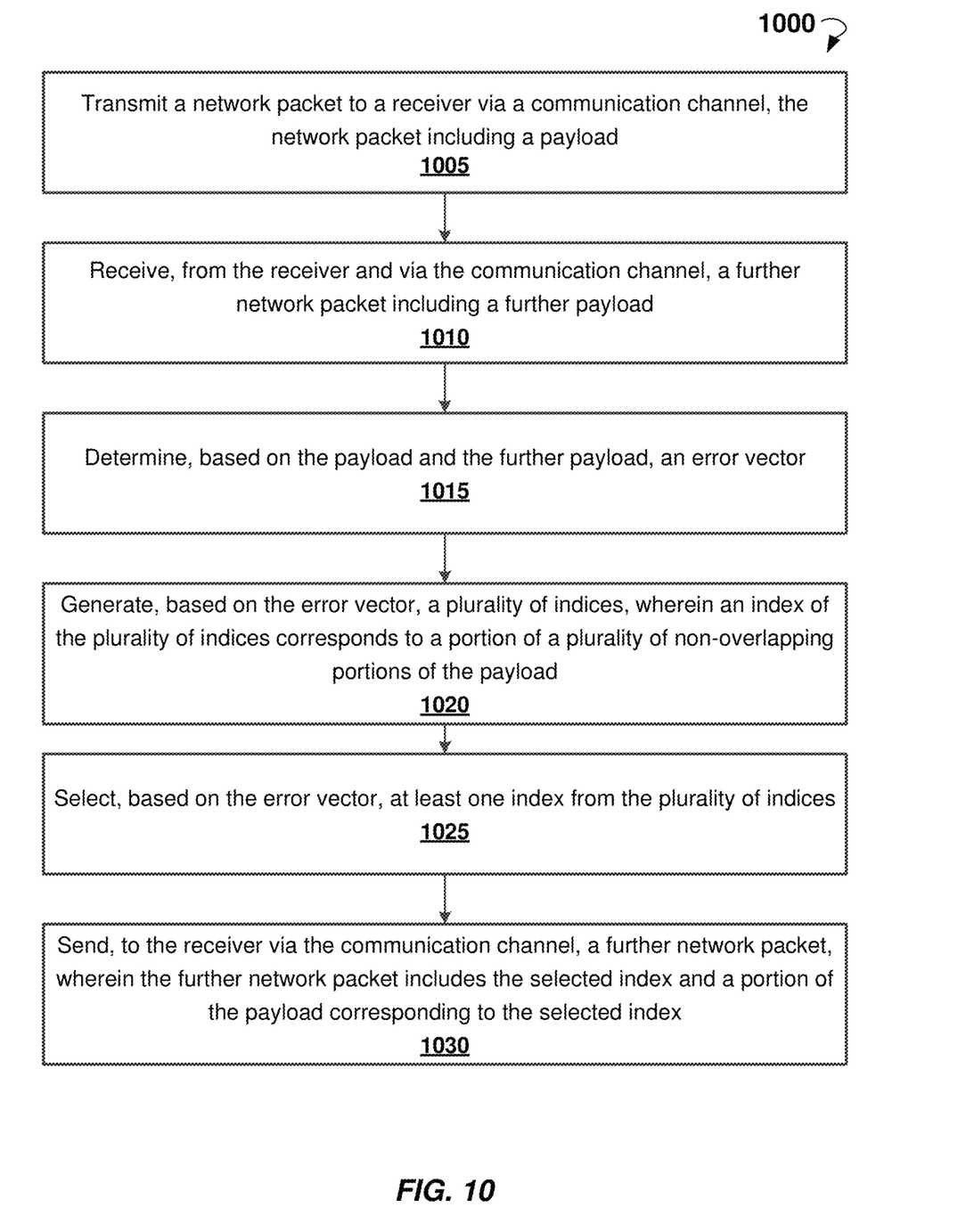
FIG. 10 is a flow chart of an example method for adaptive payload extraction and retransmission in wireless data communications, according to some example embodiments.

FIG. 10 is a flow chart of an example method 1000 for adaptive payload extraction and retransmission in wireless data communications, according to some example embodiments. The method 1000 can be performed by the system for adaptive payload extraction and retransmission in wireless data communications. Notably, the steps recited below can be implemented in order other than described and shown in the FIG. 10. Moreover, the method 1000 may have additional steps not shown herein, but which can be evident to those skilled in the art from the present disclosure.

The method 1000 may commence with transmitting, in block 1005, a network packet to a receiver via a communication channel. The network packet may include a payload. The communication channel may include a wireless communication channel.

The method 1000 may then proceed with (A) receiving, in block 1010, from the receiver and via the communication channel, a further network packet including a further payload.

The method 1000 may further include (B) determining an error vector in block 1015, based on the payload and the further payload. The error vector may be a difference between the payload and the further payload.

The method 1000 may continue with (C) generating, in block 1020, based on the error vector, a plurality of indices. An index of the plurality of indices may correspond to a portion of a plurality of non-overlapping portions of the payload. A number of bits representing the index in the plurality of indices may be determined to minimize a number of portions of the error vector. A portion of the portions of the error vector may include at least one non-zero bit and corresponds to at least one portion in the plurality of non-overlapping portions of the payload. The at least one index may include an index corresponding to at least one of the portions in the error vector. The method 1000 may include (D) selecting, in block 1025, based on the error vector, at least one index from the plurality of indices.

The method 1000 may further continue with (E) sending, in block 1030, to the receiver via the communication channel, a further network packet. The further network packet may include the selected index and a portion of the payload corresponding to the selected index. A predetermined number of first bits in the further network packet may be indicative of a configuration of partitioning the payload in the plurality of non-overlapping portions of the payload. The selected index and the portion of the payload corresponding to the selected index may be located at the beginning of the further network packet.

The method 1000 may optionally include locating, by the receiver and based on the selected at least one further index, a portion in the further payload. The method 1000 may further include replacing, by the receiver, a portion of the further payload corresponding to the selected index with the portion of the payload corresponding to the selected index. The method 1000 may, optionally, include determining, by the receiver, that the further payload has failed an error check. The determining that the further payload has failed an error check may include computing a cyclic redundancy check based on the further payload. The method 1000 may continue then with sending, in response to the determination, the further payload to the processor via the communication channel. The method 1000 may include repeating operations (A), (B), (C), (D), and (E).

Figure 11:
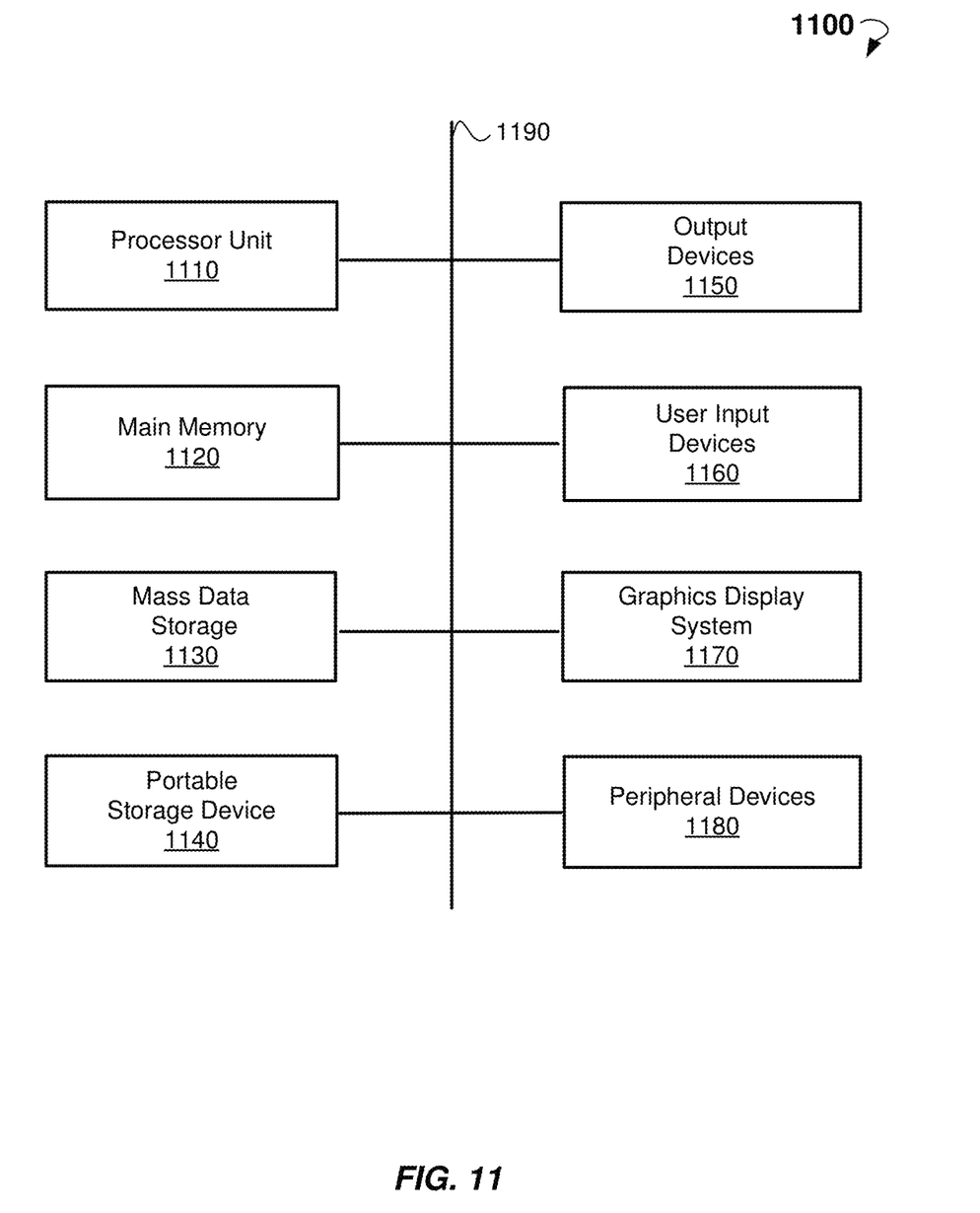
FIG. 11 illustrates an example computer system that can be used to implement some embodiments of the present disclosure.

FIG. 11 illustrates an exemplary computer system 1100 that may be used to implement some embodiments of the present disclosure. The computer system 1100 of FIG. 11 includes one or more processor units 1110 and a main memory 1120. The main memory 1120 stores, in part, instructions and data for execution by the processor units 1110. The main memory 1120 stores the executable code when in operation, in this example. The computer system 1100 of FIG. 11 further includes a mass data storage 1130, a portable storage device 1140, output devices 1150, user input devices 1160, a graphics display system 1170, and peripheral devices 1180.

The components shown in FIG. 11 are depicted as being connected via a single bus 1190. The components may be connected through one or more data transport means. The processor unit 1110 and the main memory 1120 are connected via a local microprocessor bus, and the mass data storage 1130, the peripheral device(s) 1180, the portable storage device 1140, and the graphics display system 1170 are connected via one or more I/O buses.

The mass data storage 1130, which can be implemented with a magnetic disk drive, solid state drive, or an optical disk drive, is a non-volatile storage device for storing data and instructions for use by the processor unit 1110. The mass data storage 1130 stores the system software for implementing embodiments of the present disclosure for purposes of loading that software into the main memory 1120.

The portable storage device 1140 operates in conjunction with a portable non-volatile storage medium, such as a flash drive, floppy disk, compact disk, digital video disc, or Universal Serial Bus storage device, to input and output data and code to and from the computer system 1100 of FIG. 11. The system software for implementing embodiments of the present disclosure is stored on such a portable medium and input to the computer system 1100 via the portable storage device 1140.

The user input devices 1160 can provide a portion of a user interface. The user input devices 1160 may include one or more microphones; an alphanumeric keypad, such as a keyboard, for inputting alphanumeric and other information; or a pointing device, such as a mouse, a trackball, stylus, or cursor direction keys. The user input devices 1160 can also include a touchscreen. Additionally, the computer system 1100 as shown in FIG. 11 includes the output devices 1150. Suitable output devices 1150 include speakers, printers, network interfaces, and monitors.

The graphics display system 1170 can include a liquid crystal display or other suitable display device. The graphics display system 1170 is configurable to receive textual and graphical information and process the information for output to the display device.

The peripheral devices 1180 may include any type of computer support device to add additional functionality to the computer system.

The components provided in the computer system 1100 of FIG. 11 are those typically found in computer systems that may be suitable for use with embodiments of the present disclosure and are intended to represent a broad category of such computer components that are well known in the art. Thus, the computer system 1100 of FIG. 11 can be a personal computer, a handheld computer system, a telephone, a mobile phone, a smartphone, a laptop computer, a mobile computer system, a workstation, a tablet, a phablet, a server, a minicomputer, a mainframe computer, a wearable device, or any other computer system. The computer system 1100 may also include different bus configurations, networked platforms, multi-processor platforms, and the like. Various operating systems may be used including UNIX®, LINUX®, WINDOWS®, MAC OS®, PALM OS®, QNX®, ANDROID®, IOS®, CHROME®, TIZEN®, and other suitable operating systems.

The processing for various embodiments may be implemented in software that is cloud-based. In some embodiments, the computer system 1100 is implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1100, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, systems and methods for adaptive payload extraction and retransmission in wireless data communications are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method comprising:
   transmitting a network packet to a receiver via a communication channel, the network packet including a payload;
   (A) receiving, from the receiver and via the communication channel, a further network packet including a further payload;
   (B) determining, based on the payload and the further payload, an error vector;
   (C) generating, based on the error vector, a plurality of indices, wherein an index of the plurality of indices corresponds to a portion of a plurality of non-overlapping portions of the payload;
   (D) selecting at least one index from the plurality of indices; and
   (E) sending, to the receiver via the communication channel, a further network packet, wherein the further network packet includes at least one of the selected index and a portion of the payload corresponding to the selected index.

2. The method of claim 1, wherein:
   a number of bits representing the index in the plurality of indices is determined to minimize a number of portions of the error vector.

3. The method of claim 1, wherein a predetermined number of first bits in the further network packet is indicative of a configuration of partitioning the payload in the plurality of non-overlapping portions of the payload.

4. The method of claim 1, wherein the at least one of the selected index and the portion of the payload corresponding to the selected index is located at the beginning of the further network packet.

5. The method of claim 1, wherein the selecting at least one index from the plurality of indices is based on the error vector.

6. The method of claim 1, wherein the error vector is a difference between the payload and the further payload.

7. The method of claim 1, further comprising:
   determining, by the receiver, that the further payload has failed an error check; and
   in response to the determination, sending the further payload to a processor via the communication channel.

8. The method of claim 7, further comprising repeating operations (A), (B), (C), (D), and (E).

9. The method of claim 7, wherein the determining that the further payload has failed the error check includes computing a cyclic redundancy check based on the further payload.

10. The method of claim 1, wherein the communication channel includes a wireless communication channel.

11. A system comprising:
    at least one processor; and
    a memory communicatively coupled to the processor, the memory storing instructions executable by the at least one processor to perform a method comprising:
       transmitting a network packet to a receiver via a communication channel, the network packet including a payload;
       (A) receiving, from the receiver and via the communication channel, a further network packet including a further payload;
       (B) determining, based on the payload and the further payload, an error vector;
       (C) generating, based on the error vector, a plurality of indices, wherein an index of the plurality of indices corresponds to a portion of a plurality of non-overlapping portions of the payload;
       (D) selecting at least one index from the plurality of indices; and
       (E) sending, to the receiver via the communication channel, a further network packet, wherein the further network packet includes at least one of the selected index and a portion of the payload corresponding to the selected index.

12. The system of claim 11, wherein:
    a number of bits representing the index in the plurality of indices is determined to minimize a number of portions of the error vector.

13. The system of claim 11, wherein a predetermined number of first bits in the further network packet is indicative of a configuration of partitioning the payload in the plurality of non-overlapping portions of the payload.

14. The system of claim 11, wherein the selected index and the portion of the payload corresponding to the selected index are located at in the beginning of the further network packet.

15. The system of claim 11, wherein the selecting at least one index from the plurality of indices is based on the error vector.

16. The system of claim 11, wherein the error vector is a difference between the payload and the further payload.

17. The system of claim 16, wherein the receiver is configured to:
    determine that the further payload has failed an error check; and
    in response to the determination, send the further payload to the at least one processor via the communication channel.

18. The system of claim 17, wherein the at least one processor is configured to repeat operations (A), (B), (C), (D), and (E).

19. The system of claim 17, wherein the determining that the further payload has failed the error check includes computing a cyclic redundancy check based on the further payload.

20. A non-transitory processor-readable medium having embodied thereon a program being executable by at least one processor to perform a method comprising:
- transmitting a network packet to a receiver via a communication channel, the network packet including a payload;
- receiving, from the receiver and via the communication channel, a further network packet including a further payload;
- determining, based on the payload and the further payload, an error vector;
- generating, based on the error vector, a plurality of indices, wherein an index of the plurality of indices corresponds to a portion of a plurality of non-overlapping portions of the payload;
- selecting at least one index from the plurality of indices; and
- sending, to the receiver via the communication channel, a further network packet, wherein the further network packet includes at least one of the selected index and a portion of the payload corresponding to the selected index.

* * * * *